US012460482B2

(12) United States Patent
Tiew et al.

(10) Patent No.: US 12,460,482 B2
(45) Date of Patent: Nov. 4, 2025

(54) ABSOLUTE LINEAR POSITION FOR DOWNHOLE TOOL USING ROTARY POTENTIOMETER

(71) Applicant: Halliburton Energy Services, Inc., Houston, TX (US)

(72) Inventors: Hock Soon Tiew, Singapore (SG); Kar Ki Andrew Loh, Singapore (SG); How Jiun Irvin Yuen, Singapore (SG); Simon Whye Kwong Wai, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 257 days.

(21) Appl. No.: 18/213,775

(22) Filed: Jun. 23, 2023

(65) Prior Publication Data
US 2024/0426177 A1    Dec. 26, 2024

(51) Int. Cl.
*E21B 4/18* (2006.01)
*G01D 5/165* (2006.01)

(52) U.S. Cl.
CPC ............ *E21B 4/18* (2013.01); *G01D 5/165* (2013.01)

(58) Field of Classification Search
CPC ............ G01V 3/15; G01V 3/38; G01D 5/165
See application file for complete search history.

(56) References Cited

U.S. PATENT DOCUMENTS

| 4,656,457 | A | * | 4/1987 | Brausfeld | H01C 10/44 338/183 |
| 5,072,206 | A | * | 12/1991 | Kozuka | H01C 10/38 338/183 |
| 7,140,436 | B2 | | 11/2006 | Grant et al. | |
| 7,377,333 | B1 | * | 5/2008 | Sugiura | E21B 17/1014 175/45 |
| 2020/0378237 | A1 | | 12/2020 | Wicks et al. | |
| 2021/0172300 | A1 | | 6/2021 | Rodger | |
| 2022/0001533 | A1 | | 1/2022 | Kumar et al. | |

FOREIGN PATENT DOCUMENTS

KR    10-2013-0115938    10/2013

OTHER PUBLICATIONS

International Search Report and Written Opinion for International Patent Application No. PCT/US2023/027866 dated Mar. 12, 2024. PDF file. 7 pages.

\* cited by examiner

*Primary Examiner* — Reena Aurora
(74) *Attorney, Agent, or Firm* — John Wustenberg; C. Tumey Law Group PLLC (57) ABSTRACT

A method, that includes obtaining a calibration curve, reading a voltage from a rotary potentiometer, and calculating an extension length of an actuator shaft, using the voltage and the calibration curve, where a potentiometer shaft, of the rotary potentiometer, is coupled to a potentiometer gearbox, where the potentiometer gearbox is coupled to a motor, and where the motor is coupled to the actuator shaft.

20 Claims, 7 Drawing Sheets

ABSOLUTE LINEAR POSITION FOR DOWNHOLE TOOL USING ROTARY POTENTIOMETER

BACKGROUND

For oil and gas exploration and production, a network of wells, installations and other conduits may be established by connecting sections of metal pipe together. For example, a well installation may be completed, in part, by lowering multiple sections of metal pipe (i.e., a drillstring) into a wellbore, and drilling towards a targeted area.

Towards the downhole end of the drillstring, there may be a linear actuator that forcefully extends a piston which pushes (anything attached to the piston) further into the well. Such an actuator may be a "stroker" actuator that reciprocates the piston back-and-forth to repeatedly impact an object and/or obstruction in the well.

The extended length of the actuator's piston may be measured using a linear potentiometer. The length measurement may then be returned as feedback to the actuator's control mechanism, allowing for the proper control of the piston's extension length. However, a linear encoder requires being installed in parallel with the length of the piston. In environments where there is limited space, the inclusion of a linear potentiometer may consume a considerable volume of that limited space.

BRIEF DESCRIPTION OF DRAWINGS

These drawings illustrate certain aspects of some examples of the present disclosure and should not be used to limit or define the disclosure.

DETAILED DESCRIPTION

Overview and Advantages

In general, this application discloses one or more embodiments of methods and systems for measuring the extended length of actuator shaft using a rotary encoder and gearbox. Specifically, a gearbox may be placed in-line with the motor of the actuator, which is then coupled to a rotary potentiometer. The rotary potentiometer may then be used to indirectly measure the extension length of the actuator shaft from the actuator.

In most circumstances, a rotary potentiometer may be considered to measure a "relative angle" with an origin beginning at the 0-degree position, where the output resistance is highest (or lowest). As the shaft of the potentiometer rotates, the resistance increases or decreases (depending on the direction). In some configurations, a rotary potentiometer may rotate an unlimited number of times in either direction, where the resistance output cycles through the same output range repeatedly (e.g., 0 to 1,000 ohms). That is, after a fixed number of rotations, a rotary potentiometer will "reset" and return to the lowest (or highest) value. Accordingly, a rotary potentiometer is not usually chosen to track and measure an object that is configured to rotate many times.

As an example, a rotary potentiometer may be configured to measure angles between 0 and 360 degrees in a single rotation with resistances ranging from 0 to 1,000 ohms, respectively. After a single full rotation, the resistance goes from the highest value of 1,000 ohms, immediately back to the lowest value of 0 ohms. Accordingly, when coupled to a motor that is configured to rotate 25 times (between 0 and 9,000 degrees), the rotary potentiometer will "reset" 25 times. Further, when taking a reading from the rotary potentiometer, the measured angle is only "relative" to the last full rotation. That is, if a measurement of 250 degrees is read from the rotary potentiometer, the "absolute angle" of the motor shaft angle may be 250 degrees+(N×360 degrees) (e.g., 250 degrees, 610 degrees, 970 degrees, etc.) as the rotary potentiometer does not inherently count the number of full rotations.

As disclosed herein, a gearbox may be installed between a motor shaft and a rotary potentiometer such that multiple rotations of a motor may be reduced to a measurable range by the rotary potentiometer. Continuing with the example above, if a 1:25 gearbox reduction is placed between the motor and the rotary potentiometer, 25 rotations of the motor can be reduced to a single rotation on the output of the gearbox. Thus, the same rotary potentiometer may be used to measure the "absolute angle" of the motor shaft, even as the motor shaft rotates multiple times.

As discussed further herein, a multiturn rotary potentiometer may be utilized that may be configured to rotate multiples times, up to some limit (e.g., ten rotations, offering measurements between 0 and 3,600 degrees). Such rotary potentiometers may be mechanically limited to rotate a maximum number of revolutions (e.g., ten rotations before the rotary potentiometer shaft is prevented from rotating further). When using such a multiturn rotary potentiometer, the gearbox ratio may be reduced to account for the increase in rotary potentiometer capability. Using the same example as above, a gearbox with a ratio of 1:3 may be used, where 25 rotations of the motor shaft would result in 8.33 rotations of the gearbox output (within the 10-rotation limit of the rotary potentiometer).

FIG. 1

Figure 1:
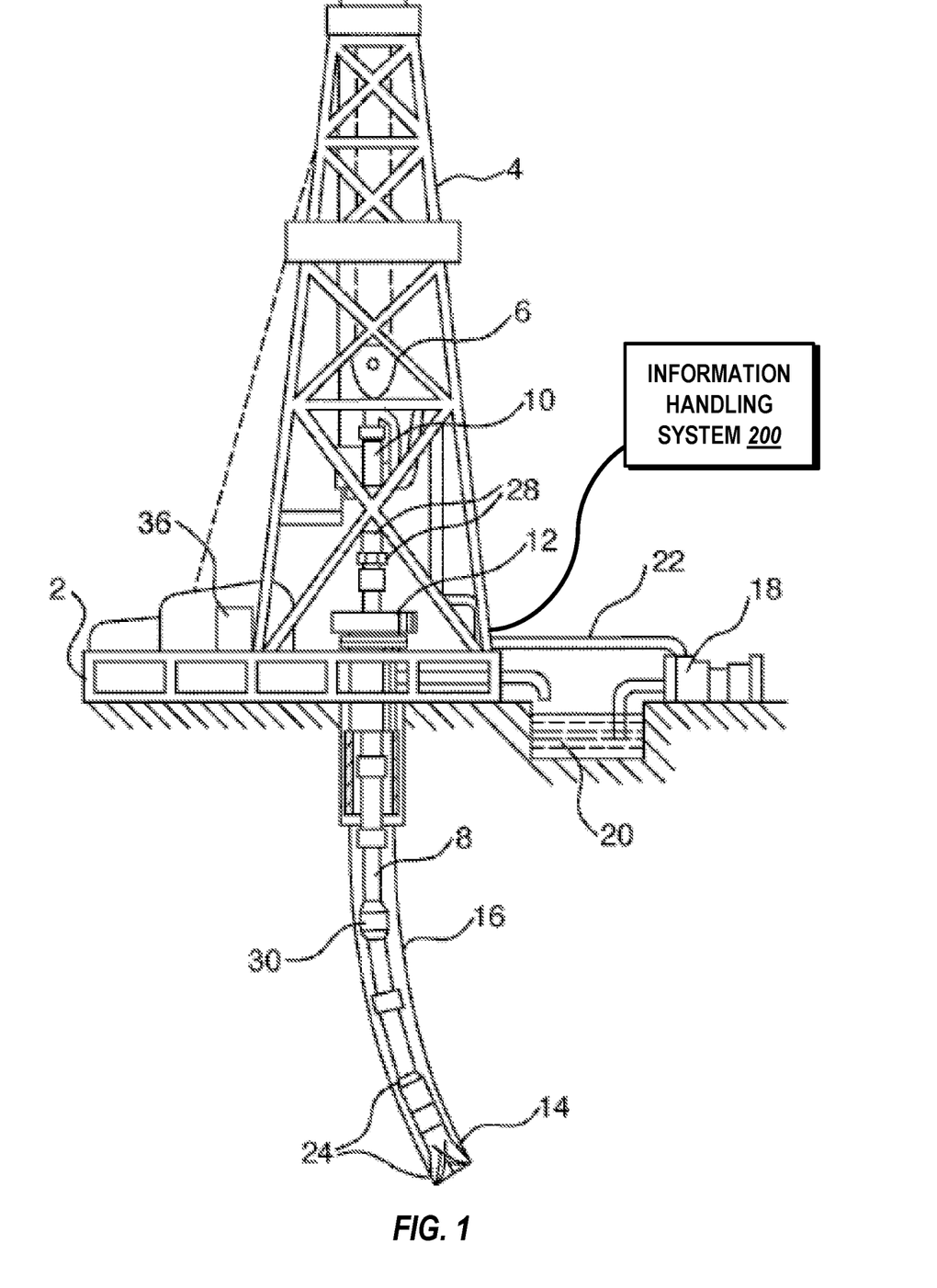
FIG. 1 is a diagram of one or more aspects of a drilling environment.

FIG. 1 is a diagram of one or more aspects of a drilling environment. Drilling platform 2 supports derrick 4 having a traveling block 6 for raising and lowering drillstring 8. Top drive 10 supports and rotates drillstring 8 as it is lowered through wellhead 12. Drill bit 14 is driven by a downhole motor and/or rotation of drillstring 8. As bit 14 rotates, it creates wellbore 16 that passes through various strata of the subterranean formation. Pump 18 circulates drilling fluid 20 through feed pipe 22, through the interior of drillstring 8 to drill bit 14. The fluid exits through orifices in drill bit 14 and flows upward through the annulus around drillstring 8 to transport drill cuttings to the surface, where the fluid is filtered and recirculated.

Drill bit 14 is just one piece of bottom-hole assembly 24 that includes a mud motor and one or more "drill collars" (thick-walled steel pipes) that provide weight and rigidity to aid the drilling process. In one or more embodiments, bottom-hole assembly 24 may include a telemetry sub to maintain a communications link with the surface. Mud pulse telemetry may be one common telemetry technique for transferring tool measurement data to surface receivers and receiving commands from the surface, but other telemetry techniques can also be used. As a non-limiting example, a technique for transferring tool measurement data to the surface and receiving commands from the surface may include through-wall acoustic signaling, wherein drillstring 8 may include one or more repeater(s) 30 to detect, amplify, and re-transmit signals both from the bottom of wellbore 16 to the surface, and from the surface to bottom-hole assembly 24. At the surface, transducers 28 may convert signals between mechanical and electrical form, enabling network interface module 36 to receive the uplink signal from the telemetry sub and transmit a downlink signal to the telemetry sub.

Information handling system 200 may be operatively connected to drillstring 8 (and/or other various components of the drilling environment). Information handling system 200 may receive a digital telemetry signal, demodulate the signal, and display the tool data or well logs to a user. Information handling system 200 may process the signals, and the information contained therein may be displayed for an operator to observe and stored for future processing and reference. Alternatively, signals may be processed downhole prior to receipt by information handling system 200. Although FIG. 1 depicts information handling system 200 as being hardwired to one or more components of the drilling environment, it should be appreciated that information handling system 200 may utilize wireless communications.

Software may govern the operation of information handling system 200. A user, for example a driller, may interact with information handling system 200 (e.g., via one or more input device(s) 222 and software executing on information handling system 200). A user may utilize information handling system 200 to employ action(s) (e.g., activating stroker actuator 316) by communicating appropriate commands to the bottom-hole assembly 24 to execute those decisions. Information handling system 200 may be operable to perform calculations or operations to evaluate a formation, identify formation boundary positions, and/or control stroker actuator 316 as further described herein.

In any embodiment, one or more tools may be connected to the end of drillstring 8 at bottom-hole assembly 24. As non-limiting examples, a shifting tool (and a shifting key thereof), drill bit 14, a suspension tool, and/or any other tool may be placed at or near the deepest downhole portion of drillstring 8. Any one (or combination) of these components may be placed after stroker actuator 402.

FIG. 2A

Figure 2A:
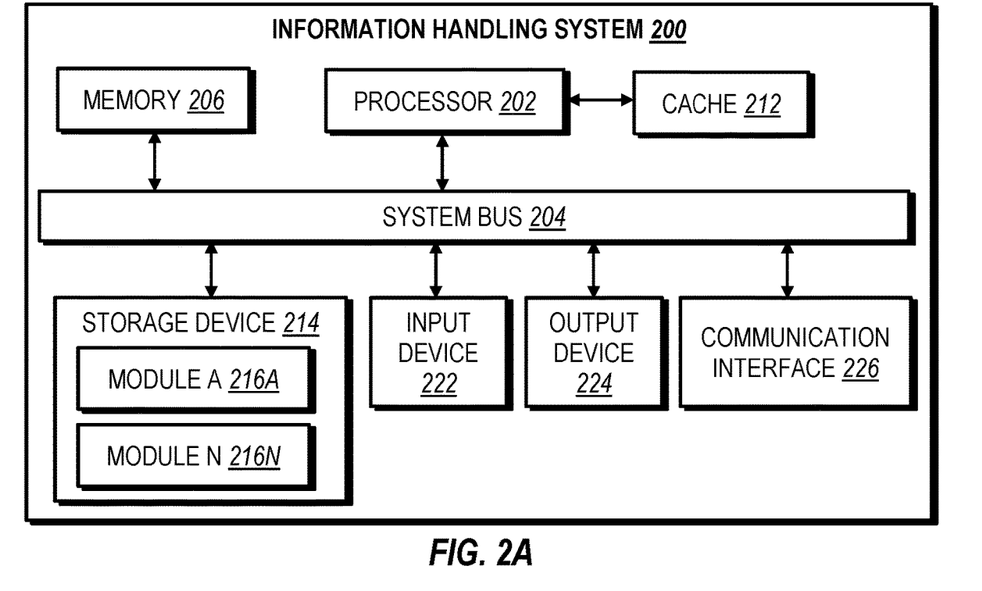
FIG. 2A is a diagram of an example information handling system.

FIG. 2A is a diagram of an example information handling system which may be utilized to perform various steps, methods, and techniques disclosed herein. As illustrated, information handling system 200 includes processor 202 and system bus 204 that operatively connects processor 202 to one or more other component(s) of information handling system 200. Other components of information handling system 200 may include (i) memory 206, (ii) storage device 214, (iii) input device 222, (iv) output device 224, and (v) communication interface 226. These other components may control or be configured to control processor 202 to perform various operations or actions. Each component described is depicted and disclosed as individual functional components. However, these individual components may be combined (or divided) into fewer (or more) components in any possible combination or configuration.

Non-limiting examples of information handling system 200 include a general purpose computer (e.g., a personal computer, desktop, laptop, tablet, smart phone, etc.), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of information handling system 200 with the aforementioned capabilities. Further, information handling system 200 may be operatively connected to another information handling system 200 via a network in a distributed computing environment.

Processor 202 is an integrated circuit configured to process computer-executable instructions (e.g., code, algorithms, software) and may take the form of any general-purpose processor (e.g., a central processing unit (CPU)). Processor 202 may execute (e.g., read and process) computer-executable instructions stored on storage device 214, memory 206, and/or cache 212. Processor 202 may be a self-contained computing system, containing multiple cores or processors, a bus, memory controller, cache, etc. Processor 202 may include multiple processors, such as a system having multiple, physically separate processors in different sockets, or a system having multiple processor cores on a single physical chip. A multi-core processor may be symmetric or asymmetric. Further, processor 202 may include multiple distributed processors located in multiple separate computing devices but configured to operate together via a communications network. Multiple processors or processor cores may share resources such as memory 206 or cache 212 or may operate using independent resources.

Non-limiting examples of processor 202 include one or more state machines, an application specific integrated circuit (ASIC), a programmable gate array (PGA), a field PGA (FPGA), a digital signal processor (DSP), or any other digital or analog circuitry configured to interpret, execute program instructions, process data, or any combination thereof. Processor 202 may logically include a hardware or software module (e.g., software module A 216A and/or software module N 216N stored in storage device 214), which is configured to control processor 202 as well as a special-purpose processor where software instructions are incorporated into processor 202.

Processor 202 may execute one or more instruction(s) for processing one or more measurement(s) according to any one or more algorithm(s), function(s), or calculation(s) discussed below. It may be appreciated that the disclosure may operate on information handling system 200 with more than one processor 202 or on a group of information handling systems 200 networked together to provide greater processing capability. The logical operations performed by processor 202 may implemented as (i) a sequence of computer implemented steps, operations, or procedures running on a programmable circuit within a general use computer, (ii) a sequence of computer implemented steps, operations, or procedures running on a specific-use programmable circuit, and/or (iii) interconnected machine modules or program engines within the programmable circuits.

Information handling system 200 may execute some or all of the recited methods, may be a part of the recited systems, and/or may operate according to instructions in the recited tangible computer-readable storage devices. Such logical operations may be implemented as modules configured to control processor 202 to perform particular functions according to the programming of software modules 216A and 216N.

Cache 212 is one or more hardware device(s) capable of storing digital information (e.g., data) in a non-transitory medium. Cache 212 may be considered "high-speed", having comparatively faster read/write access than memory 206 and storage device 214, and therefore utilized by processor 202 to process data more quickly than data stored in memory 206 or storage device 214. Accordingly, information handling system 200, via processor 202, may copy data from memory 206 and/or storage device 214 to cache 212 for comparatively speedier access and processing. Processor 202 may be operatively connected to (or include) cache 212. Cache 212 expressly excludes media such as transitory waves, energy, carrier signals, electromagnetic waves, and signals per se.

Memory 206 is one or more hardware device(s) capable of storing digital information (e.g., data) in a non-transitory medium. In one or more embodiments, when accessing memory 206, software may be capable of reading and writing data at the smallest units of data normally accessible (e.g., "bytes"). Specifically, memory 206 may include a unique physical address for each byte stored thereon, thereby enabling software to access and manipulate data stored in memory 206 by directing commands to specific physical addresses that are associated with a byte of data (i.e., "random access"). Non-limiting examples of memory 206 devices include flash memory, random access memory (RAM), dynamic RAM (DRAM), static RAM (SRAM), resistive RAM (ReRAM), read-only memory (ROM), and electrically erasable programmable ROM (EEPROM). In one or more embodiments, memory 206 devices may be volatile or non-volatile. Memory 206 expressly excludes media such as transitory waves, energy, carrier signals, electromagnetic waves, and signals per se.

Storage device 214 is one or more hardware device(s) capable of storing digital information (e.g., data) in a non-transitory medium. Non-limiting examples of storage device 214 include (i) integrated circuit storage devices (e.g., a solid-state drive (SSD), Non-Volatile Memory Express (NVMe), flash memory, etc.), (ii) magnetic storage devices (e.g., a hard disk drive (HDD), floppy disk, tape, diskette, cassettes, etc.), (iii) optical media (e.g., a compact disc (CD), digital versatile disc (DVD), etc.), and (iv) printed media (e.g., barcode, quick response (QR) code, punch card, etc.). In one or more embodiments, prior to reading and/or manipulating data located in storage device 214, data may first be copied in "blocks" (instead of "bytes") to other, intermediary storage mediums (e.g., memory 206, cache 212) where the data can then be accessed in "bytes". Storage device 214 expressly excludes media such as transitory waves, energy, carrier signals, electromagnetic waves, and signals per se.

As used herein, a non-transitory computer readable medium means any (i) storage device 214, (ii) memory 206, (iii) cache 212, and/or (iv) any other hardware device capable of non-transitorily storing and/or carrying data. When data that includes computer-executable instructions are provided to information handling system 200 via communication interface 226, information handling system 200 writes that data to memory 206, storage device 214, or cache 212. Thus, the data received via communication interface 226 is therefore stored in a non-transitory computer-readable medium. Combinations of the above should also be included within the scope of the computer-readable media.

A software module (e.g., module A 216A, module N 216N) is data that includes computer-executable instructions (e.g., code, algorithms, software, program). Computer-executable instructions include, for example, instructions and data which cause information handling system 200, and/or processor 202 thereof, to perform a certain function or series of functions. Computer-executable instructions also include program modules that are executed in standalone or network environments. Generally, program modules include routines, programs, components, data structures, objects, and the functions inherent in the design of special-purpose processors. These program modules may be utilized to perform particular tasks or implement particular abstract data types. Computer-executable instructions, associated data structures, and program modules represent examples of code for executing steps of the methods disclosed herein.

Input device 222 is one or more hardware device(s) that generate and/or input data into information handling system 200 via one or more sensor(s) or reading device(s). Non-limiting examples of input device 222 include a mouse, a keyboard, a monitor, a camera, a microphone, touchpad, touchscreen, fingerprint reader, joystick, gamepad, and/or drive for reading non-transitory computer readable media (e.g., a compact disc (CD) drive, a floppy disk drive, tape drive, etc.). To enable user interaction with information handling system 200, input device 222 represents any number of input mechanisms, such as a microphone for speech, a touch-sensitive screen for gesture or graphical input, and so forth.

Output device 224 is one or more hardware device(s) that export data from information handling system 200 via peripheral device(s). Non-limiting examples of an output device 224 include a visual display monitor, speakers, printer, LED bulb (e.g., a status light), haptic feedback device, and/or drive for writing to non-transitory computer readable media (e.g., a CD drive, a floppy disk drive, tape drive, etc.).

Communication interface 226 is one or more hardware device(s) that provide the capability to send and/or receive data with one or more other information handling systems 200 via a network. Communication interface 226 may communicate via any suitable form of wired interface (e.g., Ethernet, fiber optic, serial communication etc.) and/or wireless interface (e.g., Wi-Fi® (Institute of Electrical and Electronics Engineers (IEEE) 802.11), Bluetooth® (IEEE 802.15.1), etc.) and utilize one or more protocol(s) for the transmission and receipt of data (e.g., transmission control protocol (TCP), internet protocol (IP), remote direct memory access (RDMA), etc.). Non-limiting examples of communication interface 226 include a network interface card (NIC), a modem, an Ethernet card/adapter, and a Wi-Fi® card/adapter.

System bus 204 is a system of hardware connections (e.g., sockets, ports, wiring, conductive tracings on a printed circuit board (PCB), etc.) used for sending (and receiving) data to (and from) each of the devices connected thereto. System bus 204 allows for communication via an interface and protocol (e.g., inter-integrated circuit (I2C), peripheral component interconnect (express) (PCI(e)) fabric, etc.) that is commonly recognized by the devices utilizing system bus 204. System bus 204 may be any of several types of bus structures including a memory bus or memory controller, a peripheral bus, and a local bus using any of a variety of bus architectures. As a non-limiting example, a basic input/output (BIOS) stored in ROM, may provide the basic routine that helps to transfer information between elements using system bus 204, within information handling system 200 (e.g., during initialization). Each of the previously discussed components of information handling system 200 may be operatively connected to system bus 204, in turn allowing each of those components to communicate through system bus 204.

FIG. 2B

Figure 2B:
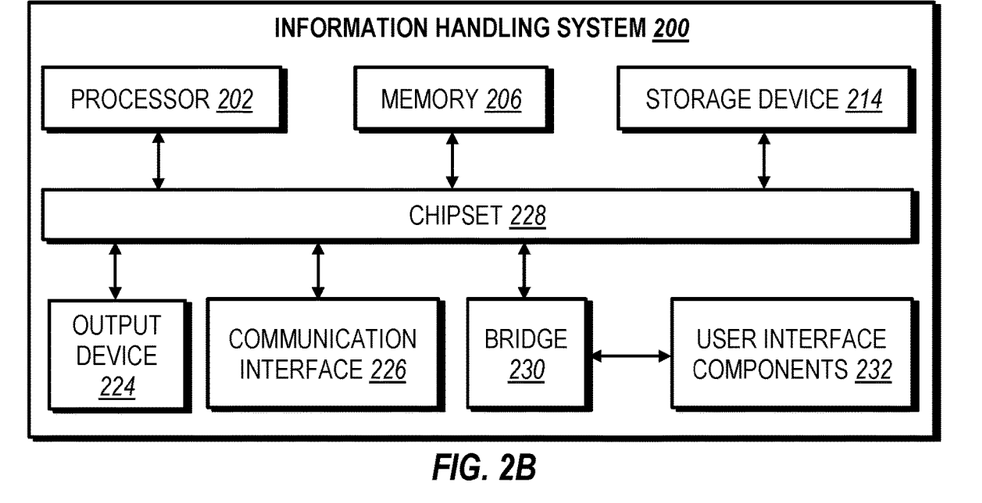
FIG. 2B is a diagram of another example information handling system.

FIG. 2B is a diagram of another example information handling system having a chipset architecture that may be used in executing a method for generating and displaying a graphical user interface (GUI). Information handling system 200 is an example of computer hardware, software, and firmware that may be used to implement the disclosed technology. Information handling system 200 may include a processor 202, representative of any number of physically and/or logically distinct resources capable of executing software, firmware, and hardware configured to perform identified computations.

Chipset 228 is one or more hardware device(s) that controls the flow of data to and from processor 202. As a non-limiting example, chipset 228 may obtain data from processor 202 (and/or cache 212 thereof) and output that data to output device 224 (e.g., a visual display monitor). Further, chipset 228 may interface with one or more communication interface(s) 226, with differing physical interfaces, to enable communication with those interfaces. As another non-limiting example, chipset 228 may receive raw data via communication interface 226, write the raw data to memory 206, send that data to processor 202 for processing, retrieve the processed data from processor 202, and then write the processed data to memory 206 and/or storage device 214.

Bridge 230 is one or more hardware device(s) that act as an interface between chipset 228 and one or more user interface component(s) 232. Non-limiting examples of user interface components 232 may include any input device 222 or output device 224 described in FIG. 2A. In general, inputs to information handling system 200 may come from any of a variety of sources—machine and/or human generated.

Some applications of the methods for generating, displaying, and using the GUI disclosed herein may include receiving ordered datasets over the physical interface. Such ordered datasets may be generated by information handling system 200 itself (e.g., by processor 202 analyzing data stored in memory 206 or storage device 214). Further, information handling system 200 may receive inputs from a user via user interface components 232 and executes corresponding functions, such as browsing functions by interpreting these inputs using processor 202.

FIGS. 3A-3B

Figure 3A:
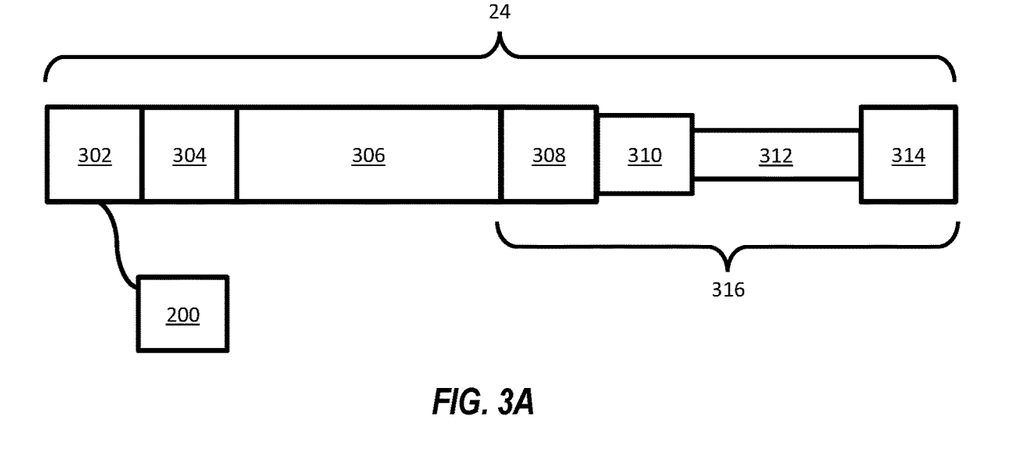
FIG. 3A is a diagram of an example bottom-hole assembly.
Figure 3B:
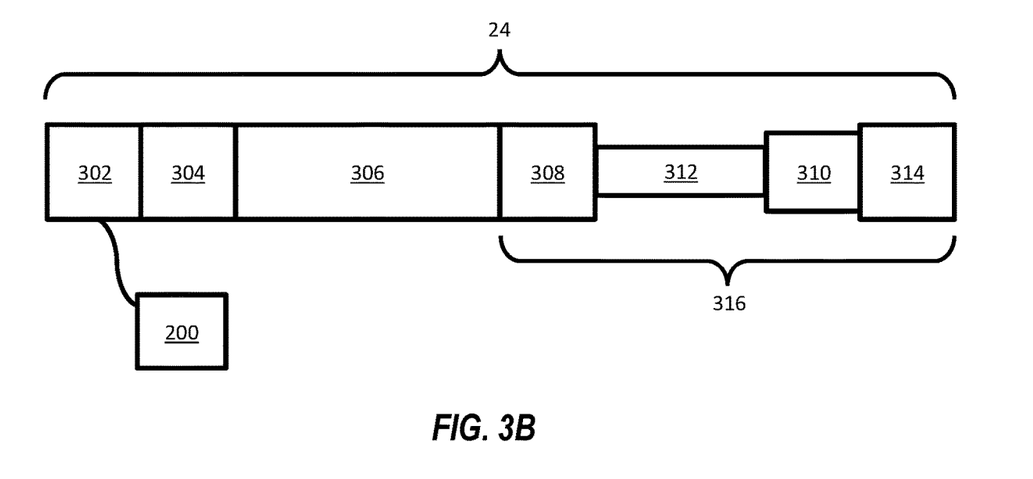
FIG. 3B is a diagram of an example bottom-hole assembly.

FIG. 3A and FIG. 3B are diagrams of example bottom-hole assemblies. Bottom-hole assembly 24 may include, as a non-limiting example, rotary potentiometer 302, potentiometer gearbox 304, motor 306, and stroker actuator 316. In turn, stroker actuator 316 may include actuator gearbox 308, nut 310, actuator shaft 312, and piston 314. Stroker actuator 316 may be placed closer to the downhole distal end of the bottom-hole assembly 24 than most of the other components. In any embodiment, one or more tools may be connected to (or beyond, "after") stroker actuator 316 further downhole. As a non-limiting example, a shifting tool (and a shifting key thereof), drill bit 14, a suspension tool, and/or any other component of bottom-hole assembly 24 may be placed after stroker actuator 316 (i.e., further downhole).

Bottom-hole assembly 24 may further include (or be operatively connected to) information handling system 200. Information handling system 200 may be on the surface (as depicted in FIG. 1) and/or may be installed locally on bottom-hole assembly 24 (or any component thereof). Each of these components is described below.

Stroker actuator 316 may further include an anchoring system (not shown) that may extend (and retract) radially away from bottom-hole assembly 24 and against the walls of the wellbore. When extended, the anchoring system increases friction and/or causes mechanical locking with wellbore 16 (see description in FIG. 1) to stabilize bottom-hole assembly 24 (and stroker actuator 316 thereof). Once stabilized, any counteracting forces resulting from forces exerted by stroker actuator 316, are felt by the anchoring system (and transferred to the walls of wellbore 16). Consequently, the other components of bottom-hole assembly 24 that are up-hole from the anchoring system experience minimized counteracting forces resulting from the operation of stroker actuator 316.

Stroker actuator 316 functions by using the output of actuator gearbox 308 to translate (i.e., longitudinally shift) piston 314, as piston 314 is rigidly mechanically coupled to either nut 310 or actuator shaft 312. In the configuration of FIG. 3A, when stroker actuator 316 causes actuator shaft 312 to reciprocate, nut 310 is held stationary (in the longitudinal direction), as actuator shaft 312 (and piston 314) moves longitudinally. FIG. 3B shows an embodiment of bottom-hole assembly 24 where nut 310 and actuator shaft 312 are transposed. In such a configuration, actuator shaft 312 rotates, but remains stationary in the longitudinal direction. Instead, nut 310 (and piston 314) move longitudinally with respect to the other components of bottom-hole assembly 24. A person of ordinary skill in the art, provided the benefit of this detailed description, would appreciate that any embodiment of the disclosed technology allows for the transposition of nut 310 and actuator shaft 312.

Rotary potentiometer 302 is an electromechanical device that may be used to measure the relative angle of the potentiometer shaft compared to the potentiometer body. Additional details regarding rotary potentiometer 302 may be found in the description of FIGS. 5A and 5B.

Motor 306 is a mechanical device that converts energy from a source (e.g., electricity, combustible fuel, etc.) into torque. As motor 306 operates (i.e., over time) motor 306 may be considered to convert one type of power (i.e., energy over time) to another source of power (e.g., electrical power into rotational/mechanical power). In any embodiment, motor 306 may be configured to include two shafts, one disposed at each opposite distal longitudinal end of motor 306, each rotating in the same speed and direction. Thus, motor 306 may provide two outputs upon which other components may mechanically couple (e.g., potentiometer gearbox 304, actuator gearbox 308).

Generally, a gearbox (e.g., rotary gearbox 304, actuator gearbox 308) is a mechanical device that includes an input and an output to mechanically couple two components with different rotational speeds, torque, and/or direction. One use of a gearbox is to accept an input from a rotating object (e.g., a rotating motor shaft) and use two or more gears to provide a rotational speed and/or torque, at the output, that is different than the shaft coupled to the input. As a non-limiting example, gears inside a gearbox may provide a 2:1 ratio, where two rotations of the input result in one rotation of the output (also resulting in increased torque at the output). A person of ordinary skill in the art, provided the benefit of this detailed description, would appreciate the functionality of gearboxes.

Rotary gearbox 304 is a gearbox used to mechanically couple to a motor shaft (of motor 306) and the potentiometer shaft (of rotary potentiometer 302). Rotary gearbox 304 is used to provide a reduced rotational speed of a motor shaft (or motor 306) such that the potentiometer shaft (of rotary potentiometer 302) rotates at a reduced rate than the motor shaft. Accordingly, as a non-limiting example, if potentiometer gearbox 304 has a ratio of 30:1, every thirty rotates of the motor shaft would result in a single rotation of the potentiometer shaft.

Actuator gearbox 308 is a gearbox used to mechanically couple to a motor shaft (of motor 306) and nut 310 or actuator shaft 312 (of stroker actuator 316). Actuator gearbox 308 may be used to provide a reduced rotation speed (and corresponding increased torque) to nut 310 or actuator shaft 312, thereby providing increased controllability and power.

The ratio needed for potentiometer gearbox 304 may be calculated given other properties of bottom-hole assembly 24. One example of calculating the minimum potentiometer gearbox 304 reduction ratio is via the following formula:

$$g_{pot} = L_{max} \times \Delta L^{-1} \times g_{act} \times R_{max}^{-1}$$

Where,
(i) "$g_{pot}$" is the gearbox ratio for potentiometer gearbox 304.
(ii) "$L_{max}$" is the maximum actuator shaft extension length 406 of actuator shaft 312.
(iii) "$\Delta L$" is the change in actuator shaft extension length 406 for one rotation of actuator shaft 312.
(iv) "$g_{act}$" is the gearbox ratio for actuator gearbox 308.
(v) "$R_{max}$" is the maximum number of rotations rotary potentiometer 302 can rotate before "resetting" (or being mechanically limited).

FIGS. 4A-4C

Figure 4A:
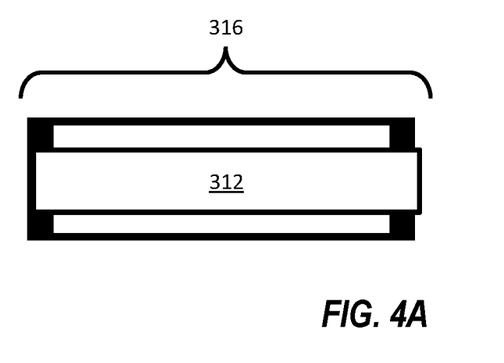
FIG. 4A is a diagram of an example retracted stroker actuator.
Figure 4B:
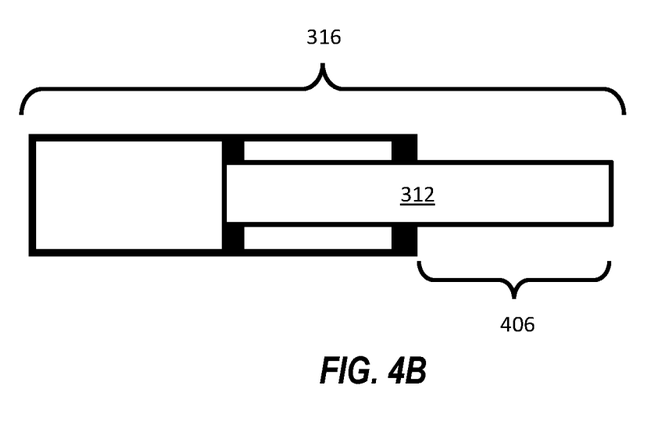
FIG. 4B is a diagram of an example partially extended stroker actuator.
Figure 4C:
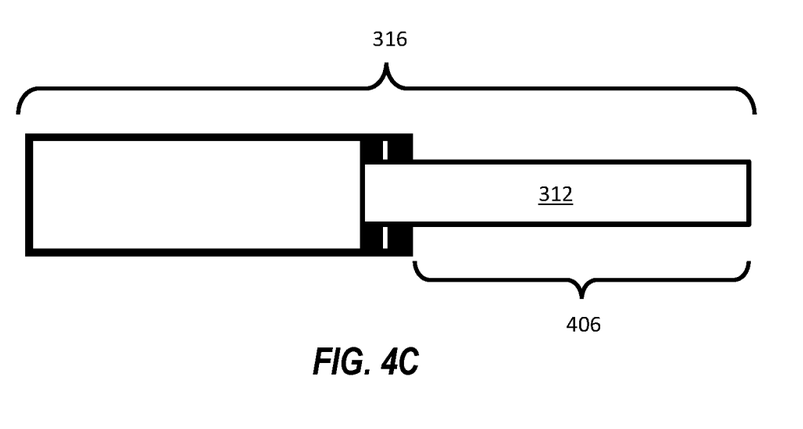
FIG. 4C is a diagram of an example fully extended stroker actuator.

FIGS. 4A, 4B, and 4C are diagrams of example of a stroker actuator with various actuator shaft extension lengths. As illustrated, stroker actuator 316 includes actuator shaft 312 that can extend and retract into the body of stroker actuator 316.

Actuator shaft 312 may be made from any solid material (e.g., metal, plastic, wood) and may be formed based on the driving mechanism of stroker actuator 316. Information handling system 200 (see description in FIGS. 2A and 2B) may control stroker actuator 316 to extend or retract actuator shaft 312 via any number of possible driving mechanisms. As a non-limiting example, actuator shaft 312 may be smooth when controlled by hydraulics. Alternatively, the actuator shaft 312 may be threaded (e.g., a screw) so that it may be driven by a ball screw collar or a roller screw mechanism. Actuator shaft 312 may be partially smooth and partially threaded (e.g., a smooth actuator shaft 312 controlled hydraulically with an extended threaded portion, or a threaded shaft controlled via a screw collar with an extended smooth portion). A person of ordinary skill in the art (provided the benefit of this detailed description) would appreciate that actuator shaft 312 may be made in any shape, size, and material suitable for the application and driving mechanism of stroker actuator 316.

Stroker actuator 316 may be used to extend actuator shaft 312 to exert force (or otherwise place pressure) on some other object (e.g., a valve, obstruction, plug, etc.) (not shown). Further, piston 314 (see FIG. 3A) may be affixed to the exposed end of actuator shaft 312, such that piston 314 is then used to impact some other object. Stroker actuator 316 may be controlled to repeatedly extend and retract actuator shaft 312 to cause actuator shaft 312 to repeatedly impact some other object (i.e., perform a reciprocating back-and-forth motion).

A distance sensor (e.g., rotary potentiometer 302) may be used to measure (e.g., obtain, convert, store) data related to the extension length of the piston beyond the supports of stroker actuator 316 (i.e., actuator shaft extension length 406). Information handling system 200 may be employed to gather, store, analyze, display, manipulate and/or otherwise process any of the data obtained by a distance sensor.

As shown in FIG. 4A, actuator shaft 312 may be fully retracted into stroker actuator 316, such that actuator shaft 312 cannot retract any further into stroker actuator 316. As shown in FIG. 4B, actuator shaft 312 may partially extend from stroker actuator 316 causing only a portion of actuator shaft 312 to be exposed. Actuator shaft extension length 406 is the length of the segment of the actuator shaft 312 extending outside of stroker actuator 316. Actuator shaft extension length 406 may be measured from the distal end exposed outside of stroker actuator 316 to the nearest support (e.g., at the opening of stroker actuator 316, a collar supporting actuator shaft 312). As shown in FIG. 4C, actuator shaft 312 may be fully (or mostly) extended from stroker actuator 316 such that actuator shaft extension length 406 is at its maximum.

Although not shown in FIGS. 4A-4C, stroker actuator 316 may be able to control actuator shaft extension length 406 to be any length between fully retracted (shown in FIG. 4A) or fully extended (shown in FIG. 4C). The partially extended actuator shaft 312 shown in FIG. 4B is just one example of many possible intermediate actuator shaft extension lengths 406.

FIG. 5A

Figure 5A:
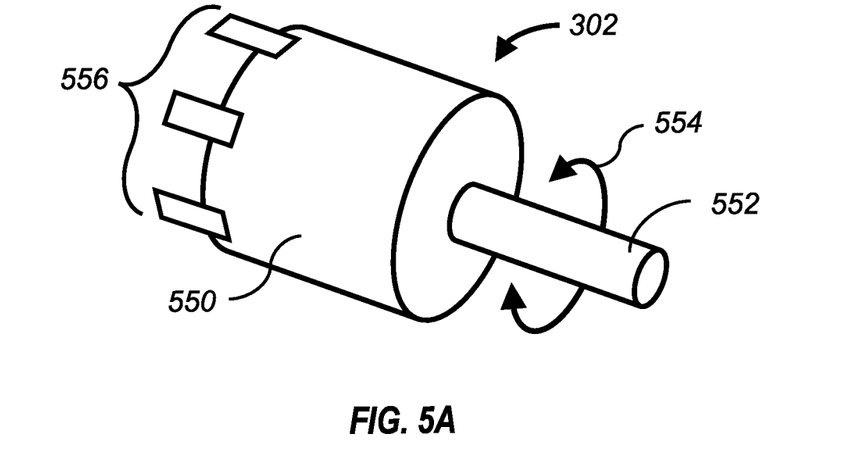
FIG. 5A is a diagram of an example rotary potentiometer.

FIG. 5A is a diagram of an example rotary potentiometer. Rotary potentiometer 302 may include potentiometer shaft 552, potentiometer body 550, and one or more contact(s) 556. Each of these components is described below.

Rotary potentiometer 302 is an electromechanical device that may be used to measure the relative angle of potentiometer shaft 552 compared to potentiometer body 550. Rotary potentiometer 302 may be operatively connected to information handling system 200 via one or more electrical contact(s) 556. In any embodiment, rotary potentiometer 302 may have a "maximum rotation limit" that is the maximum number of rotations that potentiometer shaft 552 may spin before either (i) potentiometer shaft 552 is mechanically limited from rotating further, or (ii) the output voltage resets and loops back to the highest/lowest value (i.e., as wiper 560 completes a full rotation).

Potentiometer body 550 is the rigid housing of rotary potentiometer 302. In any embodiment, potentiometer body 550 may be held comparatively stationary with respect to potentiometer shaft 552. Potentiometer body 550 may be mechanically coupled to one or more other "stationary" components (e.g., bottom-hole assembly 24).

Potentiometer shaft 552 is a solid structure that rotates independently from potentiometer body 550. Potentiometer shaft 552 may be mechanically coupled to potentiometer gearbox 304 (see description in FIG. 3A) such the motion of potentiometer shaft 552 is controlled by the output of potentiometer gearbox 304.

Potentiometer shaft rotation 554 are the rotational movements of potentiometer shaft 552. Potentiometer shaft 552 may rotate clockwise and counterclockwise about and axis longitudinally within potentiometer shaft 552.

Contacts 556 are electrically conductive interfaces used to provide power to and receive data from rotary potentiometer 302. As shown in FIG. 5A, contacts 556 may be exposed on the exterior of potentiometer body 550 to allow for easy coupling to another electrical interface. Further details regarding contacts 556 may be found in the description of FIG. 5B.

FIG. 5B

Figure 5B:
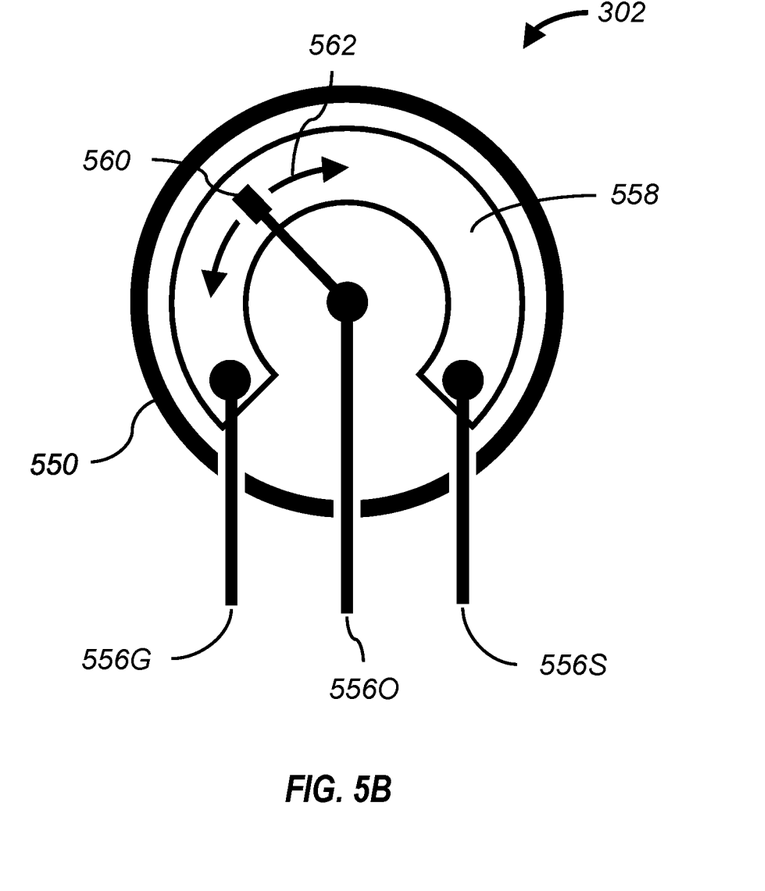
FIG. 5B is a diagram of internal components of an example rotary potentiometer.

FIG. 5B is a diagram of the internal components of an example rotary potentiometer 302. As shown in FIG. 5A, the components of rotary potentiometer 302 may be housed in potentiometer body 550, with certain components exposed for external access (e.g., contacts 556). Inside potentiometer body 550, there may be resistive element 558, wiper 560, and the internal portions of contacts 556. Each of these components is described below.

Resistive element 558 is a circular or semi-circular strip made of resistive material, such as carbon or conductive plastic, deposited or etched onto a non-conductive substrate. Resistance increases proportionally across the length of resistive element 558. Thus, when a voltage difference is applied across resistive element 558, a variation in voltage may be measured throughout the length of resistive element 558. As a non-limiting example, if 5 volts are applied to resistive element 558 ("ground" at one end, and 5 volts at the opposite end), voltage across resistive element 558 will vary depending on the point chosen to measure the voltage (measured against ground). That is, voltage between ground and the 5-volt end is likely to measure as 5 volts, whereas voltage between ground and the midpoint of resistive element 558 is likely to measure as 2.5 volts.

Wiper 560 is an electromechanical arm that rotates and "sweeps" across resistive element 558 in circular wiper motion 562. Wiper 560 makes electrical contact with resistive element 558 such that the voltage read between ground and wiper 560 varies depending on its contact point with resistive element 558. Wiper 560 may be mechanically coupled to potentiometer shaft 552 (e.g., at the axis of rotation) such that as potentiometer shaft 552 rotates, wiper 560 rotates equally.

Output contact 556O is an electrically conductive interface that is electrically coupled to wiper 560. Output contact 556O may be used to measure the voltage between ground (coupled to ground contact 556G) and wiper 560 on resistive element 558. Consequently, knowing the maximum voltage supplied to rotary potentiometer 302 (via supply contact 556S), the position of wiper 560 may be correlated to the measured voltage.

Ground contact 556G is an electrically conductive interface that is electrically coupled to one end of resistive element 558. In any embodiment, ground contact 556G may be electrically coupled to the "grounded" end of an electrical source (i.e., where "ground" is tied to body of Earth). In any embodiment, ground contact 556G may be electrically coupled to a "floating" ground that is the "negative" side of the electrical source (e.g., the negative end of the direct current (DC) side of transformer, the negative contact on a battery, etc.).

Supply contact 556S is an electrically conductive interface that is electrically coupled to one end of resistive element 558 (the end opposite to which ground contact 556G is coupled). Supply contact 556S may be coupled to a voltage supply source that provides a maximum voltage to be read across resistive element 558. As a non-limiting example, if supply contact 556S is electrically coupled to a 10-volt source, the voltage range across resistive element 558 would range between 0 volts (where ground contact 556G is coupled) to 10 volts (where supply contact 556S is coupled.

FIG. 6

Figure 6:
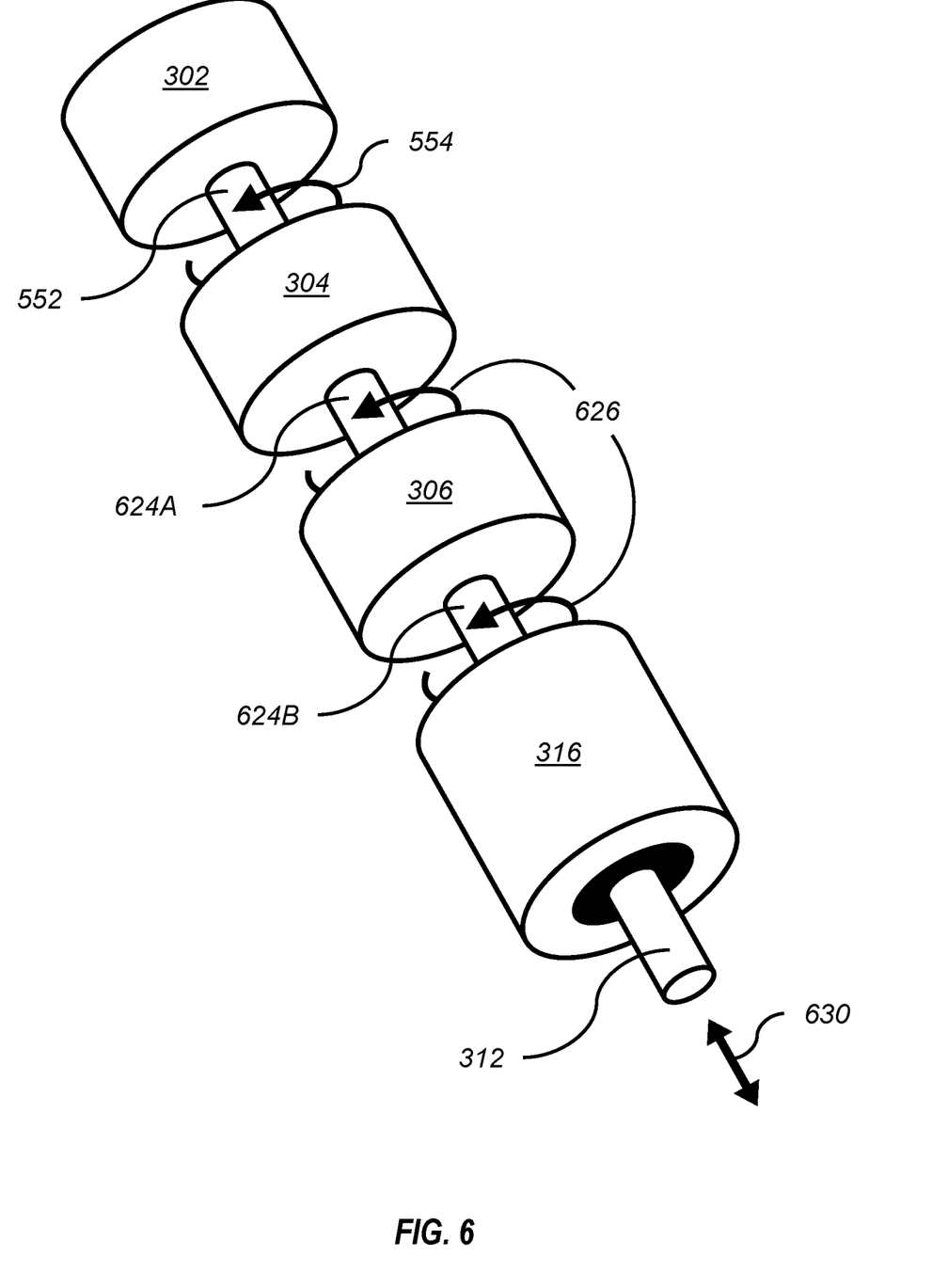
FIG. 6 is a diagram of a system showing an example configuration of a portion of bottom-hole assembly.

FIG. 6 is a diagram of a system showing an example configuration of a portion of bottom-hole assembly. The components of FIG. 6 include rotary potentiometer 302, potentiometer gearbox 304, motor 306, and stroker actuator 316. Each of these components is described below.

Motor 306 may be provided power (e.g., electrical power) causing motor shaft rotation 626 of motor shaft A 624A and motor shaft B 624B. For the purpose of the example of FIG. 6, motor 306 causes motor shaft rotation 626 to rotate counterclockwise (when view from the side of stroker actuator 316). Motor shaft A 624A is mechanically coupled to the input of potentiometer gearbox 304. Motor shaft B 624B is mechanically coupled to the input of stroker actuator 316 (or an actuator gearbox (not shown)).

In turn, stroker actuator 316 converts the rotational movement of motor shaft B 624B to linear actuator shaft motion 630 of actuator shaft 312. Thus, controlling motor 306 allows for the control of actuator shaft motion 630 of actuator shaft 312. Continuing with the example above, starting from a fully retracted position, stroker actuator 316 may allow for 30 rotations before actuator shaft 312 is at the maximum actuator shaft extension length 406. Once fully extended, motor shaft rotation 626 may be reversed (motor shaft rotation 626 rotating clockwise) to retract actuator shaft 312. Similarly, after 30 rotations clockwise, actuator shaft 312 may be fully retracted and be at the minimum actuator shaft extension length 406.

Continuing with the example above, potentiometer gearbox 304 is geared to have a 15:1 reduction. The input of potentiometer gearbox 304 is coupled to motor shaft A 624A. The output of potentiometer gearbox 304 is coupled to potentiometer shaft 552. Thus, for every fifteen rotations of motor shaft A 624A, there is only one rotation of potentiometer shaft 552.

For the purposes of the example of FIG. 6, rotary potentiometer 302 is configured to allow for only one rotation to measure "relative" angle before the output voltage resets and loops back to the highest/lowest voltage value. Thus, in order to provide an "absolute" measurement of a shaft that rotates more than once in one direction, the ratio of potentiometer gearbox 304 needs to be reduced such that potentiometer shaft rotation 554 does not exceed 360 degrees overall.

As potentiometer gearbox 304 has a 15:1 gearbox reduction ratio, the 10 rotations from motor shaft A 624A are reduced to cause only ⅔rds of a single rotation (240 degrees). Consequently, the example rotary potentiometer 302 can sufficiently measure motor shaft rotation 626 which may then be correlated to actuator shaft motion 630 and used to measure actuator shaft extension length 406.

FIG. 7

Figure 7:
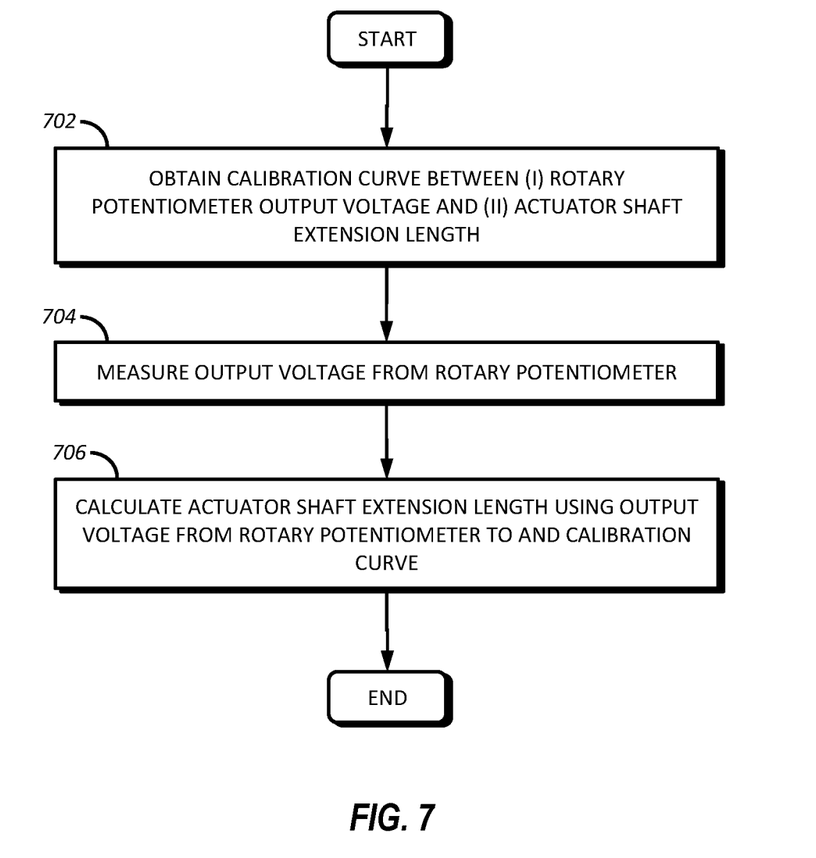
FIG. 7 is a flowchart of a method for calibrating and taking a measurement from a rotary potentiometer.

FIG. 7 is a flowchart of a method for calibrating and taking a measurement from a rotary potentiometer. All or a portion of the method shown may be performed by one or more components of information handling system 200 (see description in FIGS. 2A and 2B) or a user thereof. While the various steps in this flowchart are presented and described sequentially, one of ordinary skill in the relevant art (having the benefit of this detailed description) would appreciate that some or all steps may be executed in different orders, combined, or omitted, and some or all steps may be executed in parallel.

In block 702, a calibration curve is obtained that correlates the output voltage of rotary potentiometer 302 to the actuator shaft extension length 406. In any embodiment, obtaining the calibration curve may include reading the calibration curve from a non-transitory computer readable medium of information handling system 200. In any embodiment, obtaining the calibration curve may include generating the calibration curve by obtaining two or more measurements (using other tools, sensors, equipment) to identify a relationship between the directly measured data (rotary potentiometer output voltage) and the indirectly measured data (the actuator shaft extension length). The calibration curve may be a mathematical relationship expressible in algebraic terms, where the two properties are related via a "calibration factor" (e.g., length [in]=voltage [volts]×calibration factor [in/volts])

As a non-limiting example, actuator shaft 312 may be set to an actuator shaft extension length 406, where rotary potentiometer 302 output voltage is then measured. Both values are noted as corresponding (e.g., as a row in a table). This process is then repeated for multiple actuator shaft extension lengths 406, where rotary potentiometer 302 output voltage is measured and noted for each length. Once a sufficient number of data points are collected, a function may be identified that closely approximates the data points (given rotary potentiometer 302 output voltage as an input and actuator shaft extension length 406 as an output). In turn, this function may be used to dynamically calculate any actuator shaft extension length 406 given an arbitrary rotary potentiometer 302 output voltage.

In one or more embodiments, after block 702, but prior, during, and after block 704, stroker actuator 316 may be continuously reciprocating actuator shaft 312 (repeatedly extending and retracting actuator shaft 3124). The method described herein may be performed at any point in the stroke of the actuator shaft 312.

In block 704, a measurement is taken of the output voltage of rotary potentiometer 302. The measured may be made by information handling system 200 and recorded (i.e., stored in a non-transitory computer readable medium).

In block 706, actuator shaft extension length 406 is calculated using the calibration curve (generated in step 702) and the output voltage of rotary potentiometer 302 (measured in block 704). In any embodiment, the output voltage of rotary potentiometer 302 may be used to calculate actuator shaft extension length 406 the mathematical relationship defined in the calibration curve.

Solutions and Improvements

The methods and systems described above are an improvement over the current technology as the methods and systems described herein provide measuring the extended length of actuator shaft using a rotary encoder and gearbox. Specifically, a gearbox may be placed in-line with the motor of the actuator, which is then coupled to a rotary potentiometer. The rotary potentiometer may then be used to indirectly measure the extension length of the actuator shaft from the actuator.

Such a configuration reduces the physical volume occupied by the sensor (when compared to a traditional linear potentiometer). Further, the rotary potentiometer and gearbox configuration continues to allow for "absolute" measurement of the motor shaft, as every rotation of the motor can be tracked within the limits of the rotary potentiometer. In turn, the motor rotations are correlated to the linear position of the controlled actuator shaft. Thus, the rotary potentiometer indirectly measured the extension length of the actuator shaft.

In one or more embodiments, the rotary potentiometer may provide higher resolution (even when coupled to a gearbox) when compared against a linear potentiometer. Thus, not only does the disclosed system provide for a more compact design, but also allows for greater measurement accuracy. Further, due to the "absolute" measurement capabilities of the rotary potentiometer (when input is reduced), the measurement of the angle is readable even after a power loss (i.e., the wiper will remain statically located on the resistive element and be directly related to the actuator shaft extension length).

Statements

The systems and methods may comprise any of the various features disclosed herein, comprising one or more of the following statements.

Statement 1. A method, comprising: obtaining a calibration curve; reading a voltage from a rotary potentiometer; and calculating an extension length of an actuator shaft, using the voltage and the calibration curve, wherein a potentiometer shaft, of the rotary potentiometer, is coupled to a potentiometer gearbox, wherein the potentiometer gearbox is coupled to a motor, and wherein the motor is coupled to the actuator shaft.

Statement 2. The method of statement 1, wherein the potentiometer gearbox is coupled to a first motor shaft of the motor.

Statement 3. The method of statement 2, wherein the first motor shaft is rotating more quickly than the potentiometer shaft.

Statement 4. The method of any previous statement 2 or 3, wherein the actuator shaft is coupled to a second motor shaft of the motor.

Statement 5. The method of statement 4, wherein the first motor shaft and the second motor shaft are disposed at opposite distal ends of the motor.

Statement 6. The method of any previous statement 2, 3, or 4, wherein the extension length of the actuator shaft is at a minimum length.

Statement 7. The method of statement 6, wherein the method further comprises: extending the actuator shaft from the extension length to a second extension length that is a maximum length.

Statement 8. The method of statement 7, wherein while extending the actuator shaft from the extension length to the second extension length, a maximum rotation limit, of the rotary potentiometer, is not exceeded.

Statement 9. The method of any previous statement 7 or 8, wherein while extending the actuator shaft from the extension length to the second extension length, the first motor shaft rotates more than a maximum rotation limit of the rotary potentiometer.

Statement 10. The method of statement 9, wherein the potentiometer gearbox has a reduction ratio to prevent the potentiometer shaft from rotating more than the maximum rotation limit of the rotary potentiometer.

Statement 11. A system, comprising: a stroker actuator comprising an actuator shaft; a motor coupled to the stroker actuator; a potentiometer gearbox coupled to the motor; a rotary potentiometer comprising a potentiometer shaft, wherein the potentiometer shaft is coupled to the potentiometer gearbox; and an information handling system configured for: obtaining a calibration curve; reading a voltage from the rotary potentiometer; and calculating an extension length of the actuator shaft, using the voltage and the calibration curve.

Statement 12. The system of statement 11, wherein the potentiometer gearbox is coupled to a first motor shaft of the motor.

Statement 13. The system of statement 12, wherein the first motor shaft is rotating more quickly than the potentiometer shaft.

Statement 14. The method of any previous statement 12 or 13, wherein the actuator shaft is coupled to a second motor shaft of the motor.

Statement 15. The system of statement 14, wherein the first motor shaft and the second motor shaft are disposed at opposite distal ends of the motor.

Statement 16. The method of any previous statement 12, 13, or 14, wherein the extension length of the actuator shaft is at a minimum length.

Statement 17. The system of statement 16, wherein the information handling system is further configured for: extending the actuator shaft from the extension length to a second extension length that is a maximum length.

Statement 18. The system of statement 17, wherein while extending the actuator shaft from the extension length to the second extension length, a maximum rotation limit, of the rotary potentiometer, is not exceeded.

Statement 19. The method of any previous statement 17 or 18, wherein while extending the actuator shaft from the extension length to the second extension length, the first motor shaft rotates more than a maximum rotation limit of the rotary potentiometer.

Statement 20. The system of statement 19, wherein the potentiometer gearbox has a reduction ratio to prevent the potentiometer shaft from rotating more than the maximum rotation limit of the rotary potentiometer.

General Notes

As it is impracticable to disclose every conceivable embodiment of the technology described herein, the figures, examples, and description provided herein disclose only a limited number of potential embodiments. One of ordinary skill in the art would appreciate that any number of potential variations or modifications may be made to the explicitly disclosed embodiments, and that such alternative embodiments remain within the scope of the broader technology. Accordingly, the scope should be limited only by the attached claims. Further, the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. Certain technical details, known to those of ordinary skill in the art, may be omitted for brevity and to avoid cluttering the description of the novel aspects.

For further brevity, descriptions of similarly-named components may be omitted if a description of that similarly-named component exists elsewhere in the application. Accordingly, any component described with regard to a specific figure may be equivalent to one or more similarly-named components shown or described in any other figure, and each component incorporates the description of every similarly-named component provided in the application (unless explicitly noted otherwise). A description of any component is to be interpreted as an optional embodiment—which may be implemented in addition to, in conjunction with, or in place of an embodiment of a similarly-named component described for any other figure.

Lexicographical Notes

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" is used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

What is claimed is:
1. A method, comprising:
   obtaining a calibration curve that correlates an output voltage of a rotary potentiometer with an extension length of an actuator shaft;

reading the output voltage from the rotary potentiometer; and calculating the extension length of the actuator shaft, using the output voltage and the calibration curve, wherein a potentiometer shaft, of the rotary potentiometer, is coupled to a potentiometer gearbox, wherein the potentiometer gearbox is coupled to a motor, and wherein the motor is coupled to the actuator shaft.

2. The method of claim 1, wherein the potentiometer gearbox is coupled to a first motor shaft of the motor.

3. The method of claim 2, wherein the first motor shaft is rotating more quickly than the potentiometer shaft.

4. The method of claim 2, wherein the actuator shaft is coupled to a second motor shaft of the motor.

5. The method of claim 4, wherein the first motor shaft and the second motor shaft are disposed at opposite distal ends of the motor.

6. The method of claim 2, wherein the extension length of the actuator shaft is at a minimum length.

7. The method of claim 6, wherein the method further comprises:

extending the actuator shaft from the extension length to a second extension length that is a maximum length.

8. The method of claim 7, wherein while extending the actuator shaft from the extension length to the second extension length, a maximum rotation limit, of the rotary potentiometer, is not exceeded.

9. The method of claim 7, wherein while extending the actuator shaft from the extension length to the second extension length, the first motor shaft rotates more than a maximum rotation limit of the rotary potentiometer.

10. The method of claim 9, wherein the potentiometer gearbox has a reduction ratio to prevent the potentiometer shaft from rotating more than the maximum rotation limit of the rotary potentiometer.

11. A system, comprising:
a stroker actuator comprising an actuator shaft;
a motor coupled to the stroker actuator;
a potentiometer gearbox coupled to the motor;
a rotary potentiometer comprising a potentiometer shaft, wherein the potentiometer shaft is coupled to the potentiometer gearbox; and
an information handling system configured for:
obtaining a calibration curve that correlates an output voltage of the rotary potentiometer with an extension length of the actuator shaft;
reading the output voltage from the rotary potentiometer; and
calculating the extension length of the actuator shaft, using the output voltage and the calibration curve.

12. The system of claim 11, wherein the potentiometer gearbox is coupled to a first motor shaft of the motor.

13. The system of claim 12, wherein the first motor shaft is rotating more quickly than the potentiometer shaft.

14. The system of claim 12, wherein the actuator shaft is coupled to a second motor shaft of the motor.

15. The system of claim 14, wherein the first motor shaft and the second motor shaft are disposed at opposite distal ends of the motor.

16. The system of claim 12, wherein the extension length of the actuator shaft is at a minimum length.

17. The system of claim 16, wherein the information handling system is further configured for:

extending the actuator shaft from the extension length to a second extension length that is a maximum length.

18. The system of claim 17, wherein while extending the actuator shaft from the extension length to the second extension length, a maximum rotation limit, of the rotary potentiometer, is not exceeded.

19. The system of claim 17, wherein while extending the actuator shaft from the extension length to the second extension length, the first motor shaft rotates more than a maximum rotation limit of the rotary potentiometer.

20. The system of claim 19, wherein the potentiometer gearbox has a reduction ratio to prevent the potentiometer shaft from rotating more than the maximum rotation limit of the rotary potentiometer.

* * * * *